(12) United States Patent
Park et al.

(10) Patent No.: US 11,375,530 B2
(45) Date of Patent: Jun. 28, 2022

(54) METHOD AND APPARATUS FOR TRANSMITTING AND RECEIVING INFORMATION REGARDING MODULATION AND DEMODULATION IN SIDELINK COMMUNICATION

(71) Applicant: KT CORPORATION, Gyeonggi-do (KR)

(72) Inventors: Ki-Hyeon Park, Seoul (KR); Ki-tae Kim, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 86 days.

(21) Appl. No.: 16/908,034

(22) Filed: Jun. 22, 2020

(65) Prior Publication Data

US 2020/0413431 A1 Dec. 31, 2020

(30) Foreign Application Priority Data

Jun. 28, 2019 (KR) .................. 10-2019-0078289
Mar. 24, 2020 (KR) .................. 10-2020-0035406

(51) Int. Cl.
*H04W 72/12* (2009.01)
*H04L 1/00* (2006.01)
*H04W 92/18* (2009.01)

(52) U.S. Cl.
CPC ....... *H04W 72/1289* (2013.01); *H04L 1/0003* (2013.01); *H04L 1/0009* (2013.01); *H04L 1/0016* (2013.01); *H04W 92/18* (2013.01)

(58) Field of Classification Search
CPC ............. H04W 72/1289; H04L 1/0003; H04L 1/0009; H04L 1/0016
See application file for complete search history.

(56) References Cited

U.S. PATENT DOCUMENTS

| | | | |
|---|---|---|---|
| 10,993,093 B2* | 4/2021 | Cao | H04W 76/27 |
| 2019/0182859 A1* | 6/2019 | Khoryaev | H04L 1/0013 |
| 2020/0052843 A1* | 2/2020 | Cheng | H04L 5/0051 |
| 2020/0178216 A1* | 6/2020 | Huang | H04W 80/02 |
| 2020/0275425 A1* | 8/2020 | Cao | H04W 4/44 |
| 2020/0322924 A1* | 10/2020 | Kim | H04W 76/14 |
| 2021/0014831 A1* | 1/2021 | Ryu | H04W 76/11 |
| 2021/0234628 A1* | 7/2021 | Nakamura | H04L 27/2601 |

* cited by examiner

*Primary Examiner* — Min Jung
(74) *Attorney, Agent, or Firm* — Inventstone Patent, LLC

(57) ABSTRACT

Provided are methods and apparatuses for receiving information regarding modulation and demodulation in sidelink communication. The methods and apparatuses may receive configuration information on a resource pool used for sidelink transmission, receive information on an MCS (Modulation and Coding Scheme) table used for modulation of a sidelink signal among at least one MCS tables for the resource pool based on the configuration information, and perform demodulation on the received sidelink signal based on the information on the received MCS table.

12 Claims, 21 Drawing Sheets

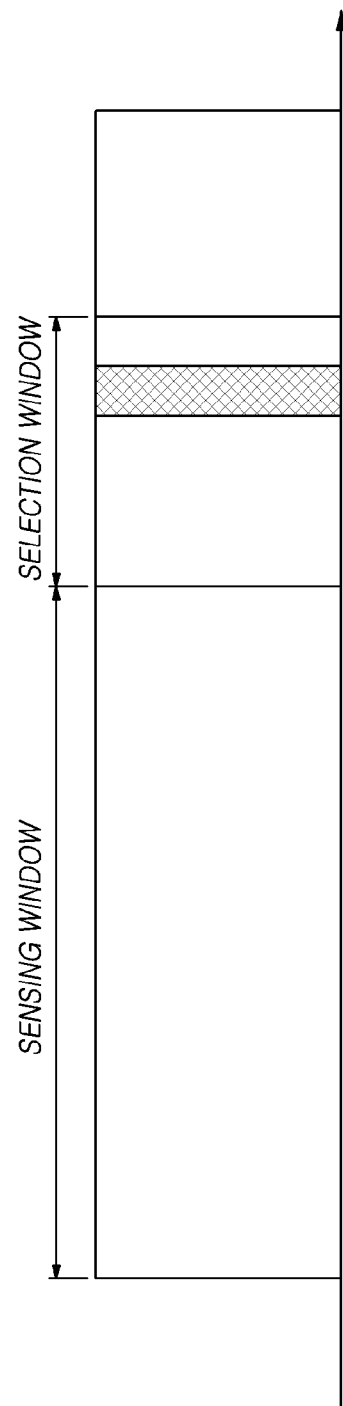

FIG.17

| ... | MCS table Indication information | ... | MCS index | ... | PSSCH scheduling information | ... |

SCI format

METHOD AND APPARATUS FOR TRANSMITTING AND RECEIVING INFORMATION REGARDING MODULATION AND DEMODULATION IN SIDELINK COMMUNICATION

CROSS-REFERENCE TO RELATED APPLICATION

This application claims the priority benefit of Korean Patent Application No. 10-2019-0078289, filed on Jun. 28, 2019 and No. 10-2020-0035406, filed on Mar. 24, 2020 in the Korean Intellectual Property Office, the disclosures of which are incorporated herein by reference in their entirety.

BACKGROUND

1. Technical Field

The present disclosure relates to methods and apparatuses for transmitting and receiving information regarding modulation and demodulation used for side-link communication in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

As part of this aspect, it is necessary to transmit information regarding modulation and demodulation of signals used when transmitting a NR sidelink which is a wireless/radio link (e.g., sidelink) between terminals for providing V2X service in the NR.

SUMMARY

In accordance with embodiments of the present disclosure, methods and apparatuses are provided for transmitting and receiving information required to modulate and demodulate a signal transmitted on the NR sidelink.

In accordance with one aspect of the present disclosure, a method of a transmitting user equipment is provided for receiving information regarding modulation and demodulation in sidelink communication. The method may include: receiving configuration information on a resource pool used for sidelink transmission; receiving information on an MCS (Modulation and Coding Scheme) table used for modulation of a sidelink signal among at least one MCS table for the resource pool based on the configuration information; and performing demodulation on the received sidelink signal based on the information on the received MCS table.

In accordance with other aspect of the present disclosure, a method of a transmitting UE of receiving information regarding modulation and demodulation in sidelink communication. The method may include: receiving configuration information on a resource pool used for sidelink transmission; performing modulation of a sidelink signal by using one MCS (Modulation and Coding Scheme) table among at least one MCS table for the resource pool based on the configuration information; and transmitting information on the MCS table used for the modulation of the sidelink signal.

In accordance with another aspect of the present disclosure, an user equipment is provided for receiving information regarding modulation and demodulation in sidelink communication. The user equipment may include: a receiver configured to configuration information on a resource pool used for sidelink transmission and receiving information on an MCS (Modulation and Coding Scheme) table used for modulation of a sidelink signal among at least one MCS table for the resource pool based on the configuration information; and a controller configured to perform demodulation on the received sidelink signal based on the information on the received MCS table.

In accordance with embodiments of the present disclosure, it is possible to provide methods and apparatuses for transmitting and receiving information required to modulate and demodulate a signal transmitted on the NR sidelink.

BRIEF DESCRIPTION OF THE DRAWINGS

The above and other aspects, features, and advantages of the present disclosure will be more apparent from the following detailed description taken in conjunction with the accompanying drawings, in which:

FIGS. 11A and 11B illustrate a type of a V2X transmission resource pool;

FIG. 17 illustrates an example of the SCI including the information on the MCS table according to a second embodiment;

DETAILED DESCRIPTION

Figure 1:
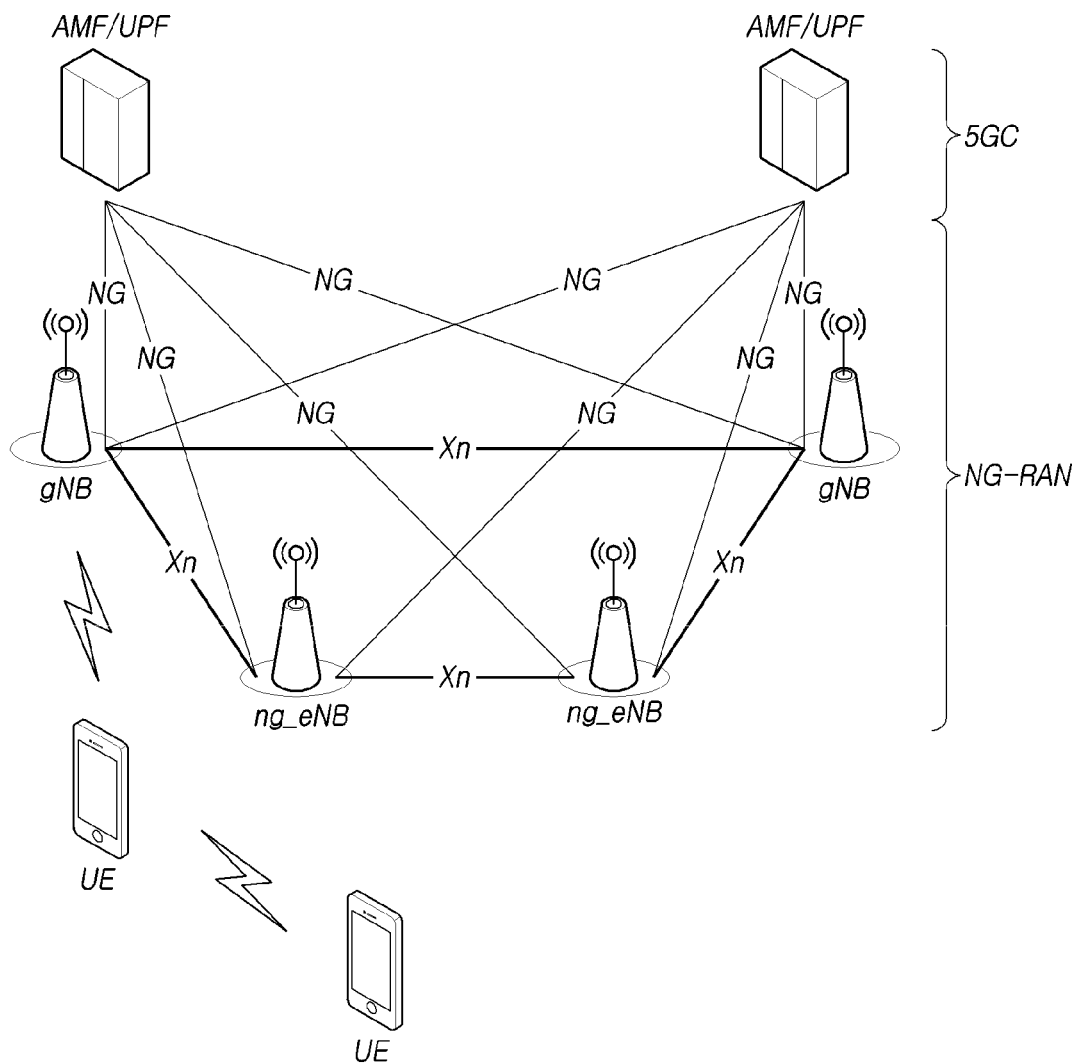
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electronics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
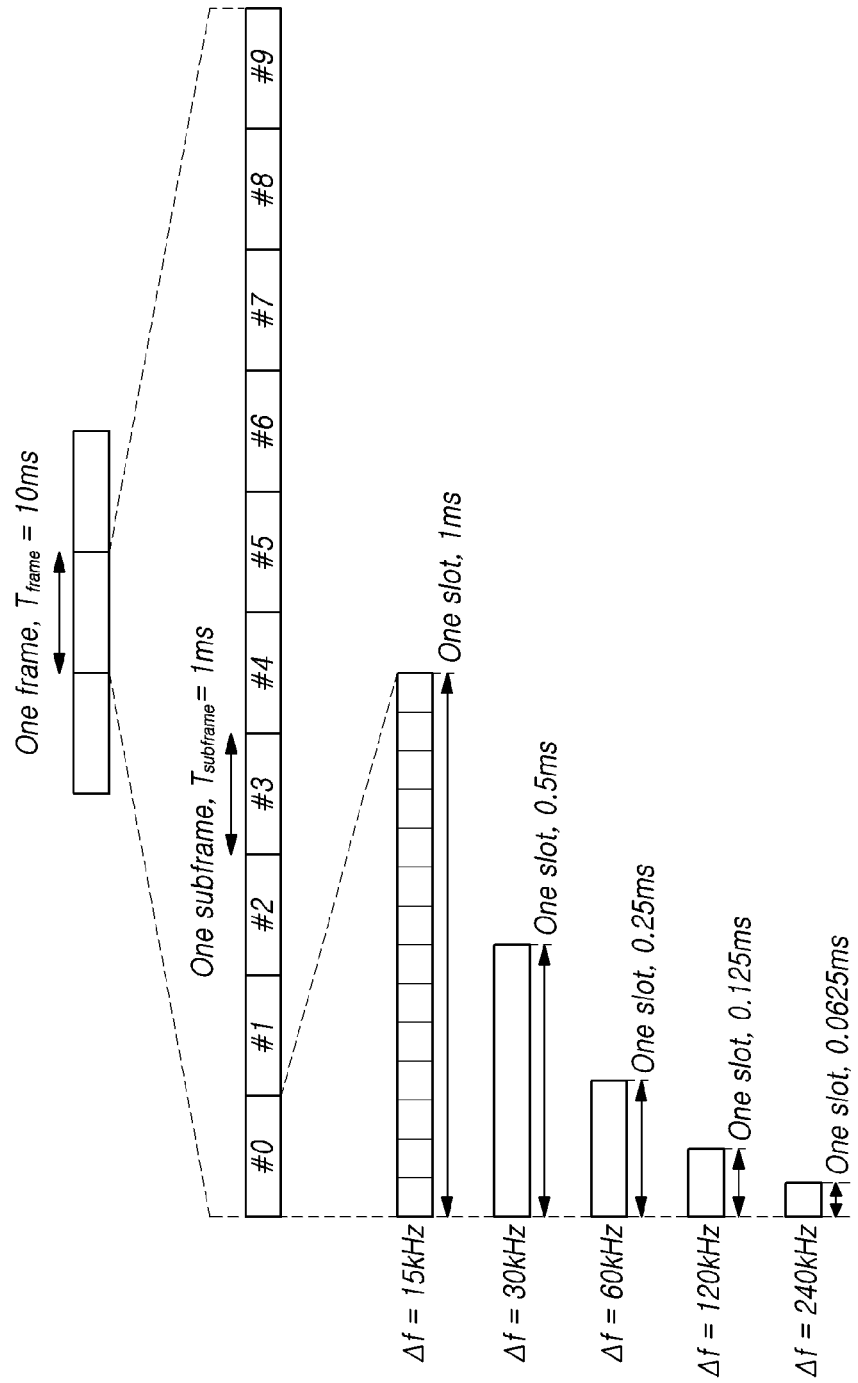
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource assignment as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
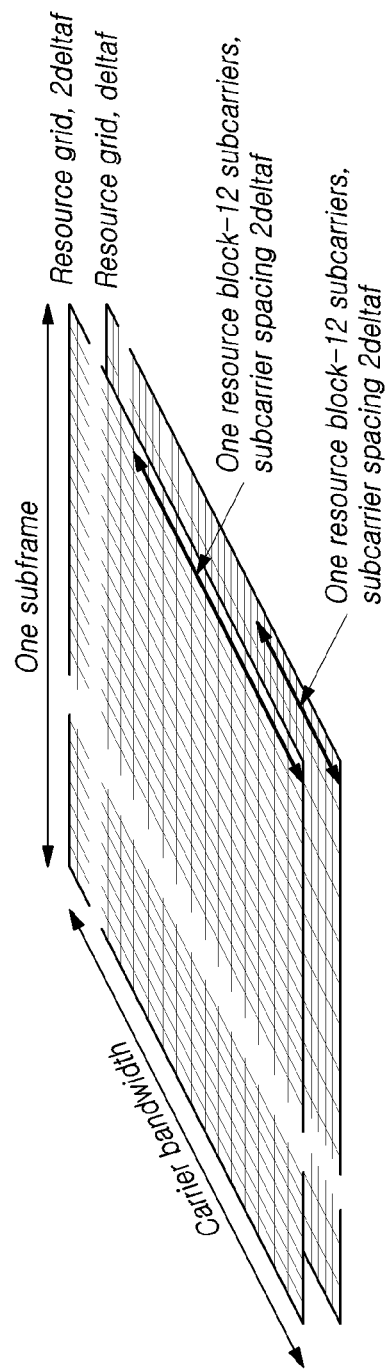
FIG. 3 illustrates resource grids supported by a radio access technology in accordance with embodiments of the present disclosure.

FIG. 3 illustrates resource grids supported by a radio access technology in accordance with embodiments of the present disclosure;

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
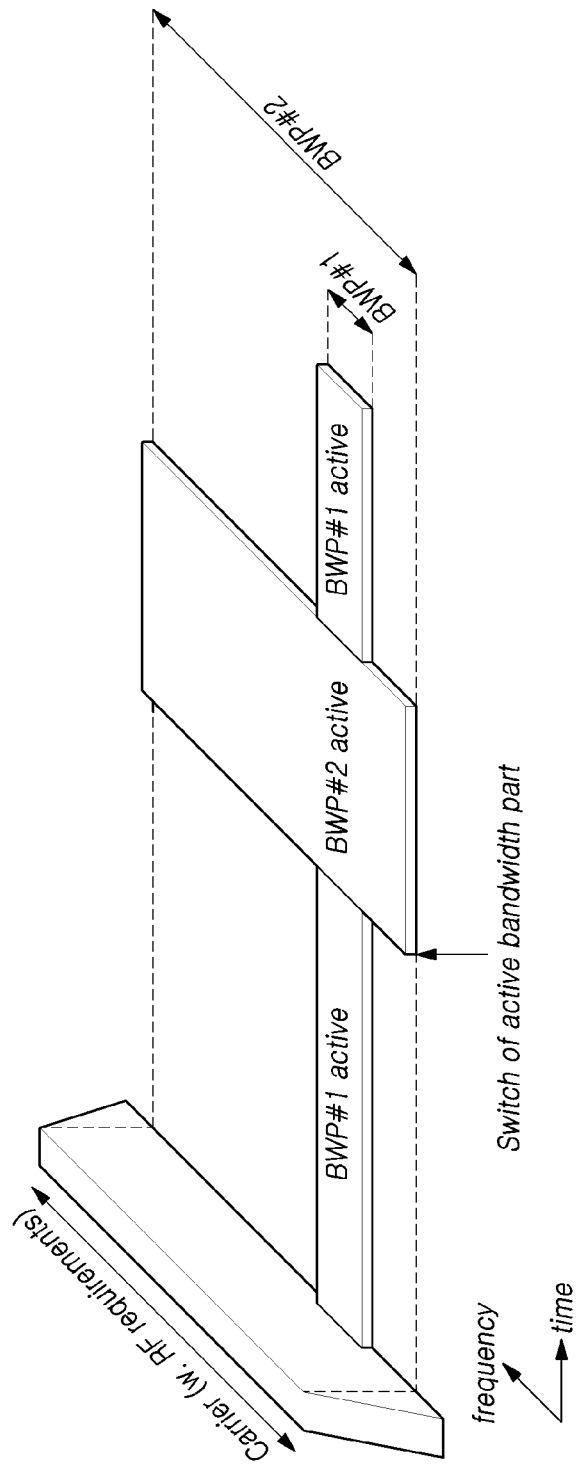
FIG. 4 illustrates bandwidth parts supported by a radio access technology in accordance with embodiments of the present disclosure.

FIG. 4 illustrates bandwidth parts supported by a radio access technology in accordance with embodiments of the present disclosure;

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
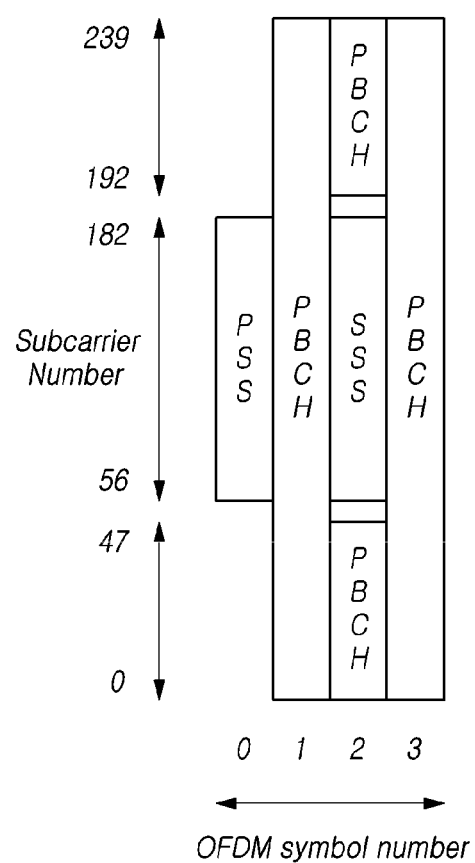
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure;

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
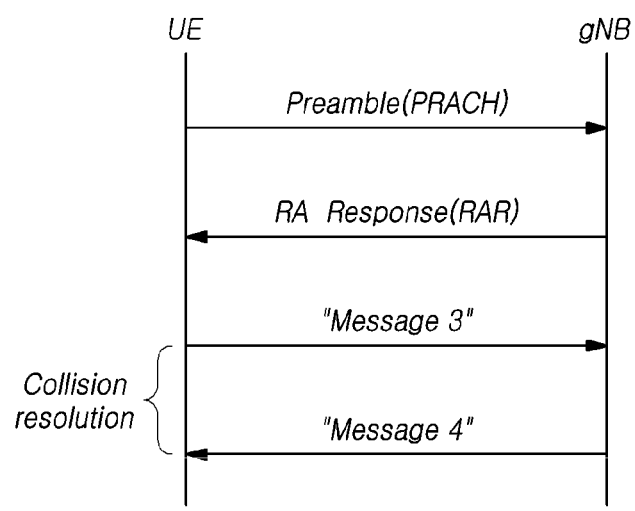
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
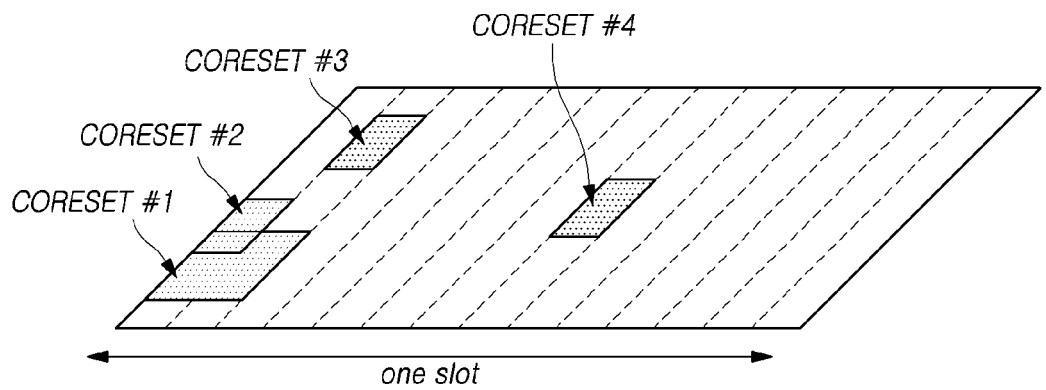
FIG. 7 illustrates CORESET.

FIG. 7 illustrates CORESET;

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
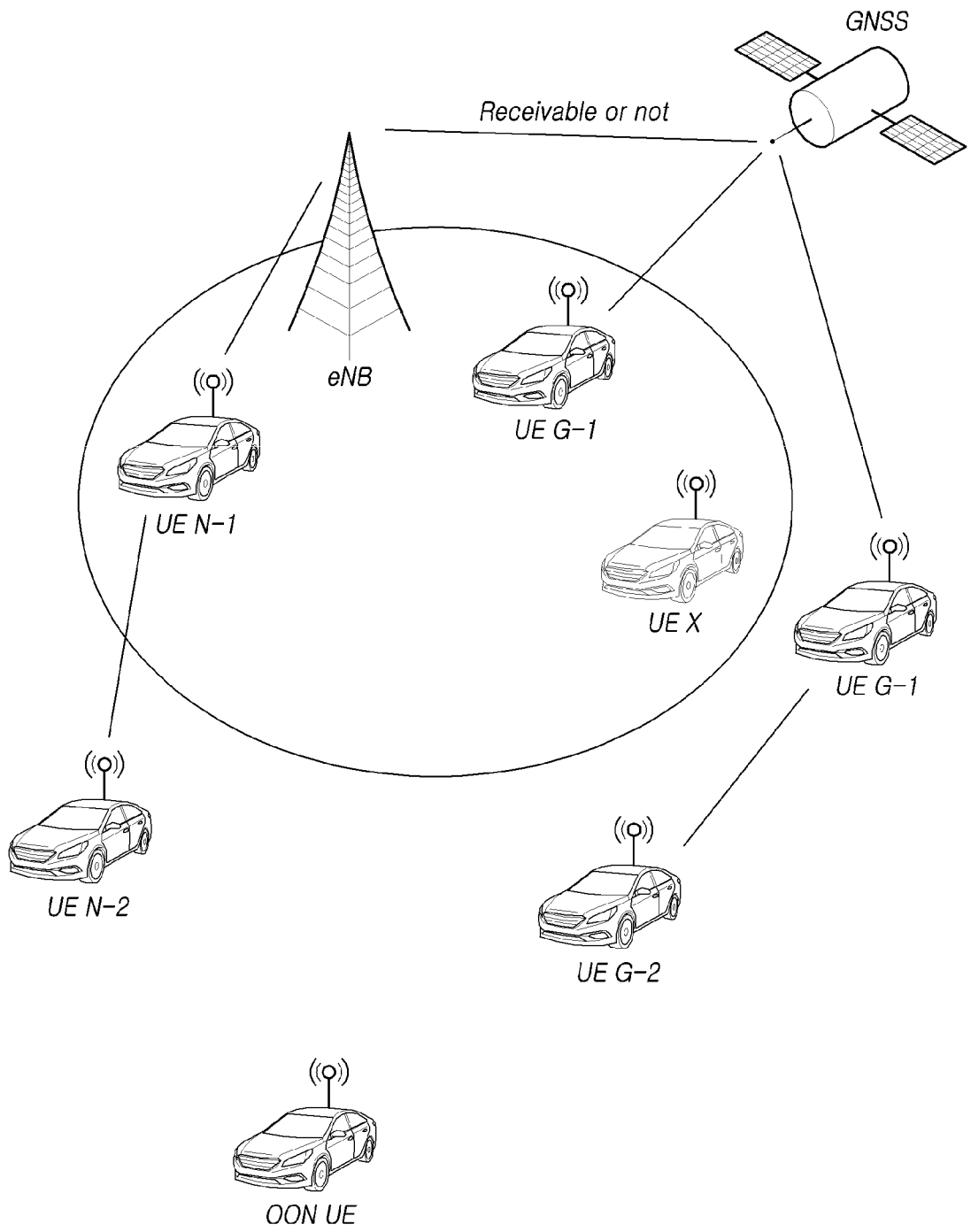
FIG. 8 illustrates various scenarios for V2X communication.

FIG. 8 illustrates various scenarios for V2X communication;

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitting UE.

Figure 9A:
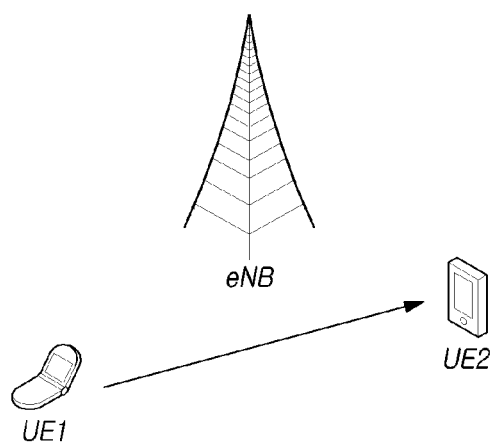
FIG. 9A illustrates a first user equipment (UE1) and a second user equipment (UE2) performing sidelink communication.
Figure 9B:
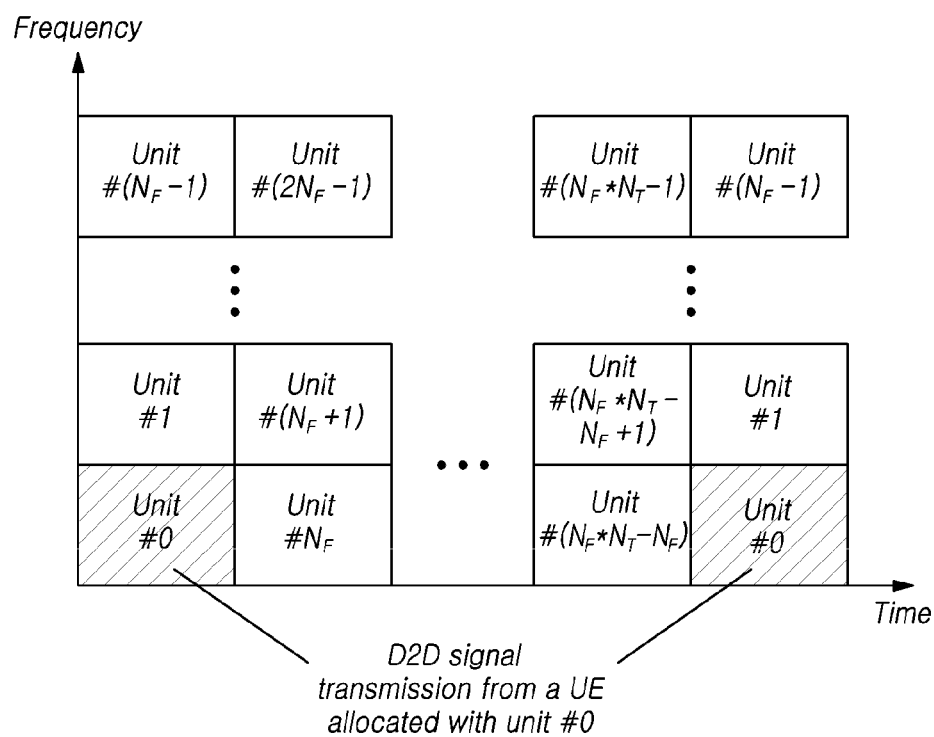
FIG. 9B illustrates an example of resource pools for user equipments.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, the base station may be a gNB or an ng-eNB. Further, the UEs represent mobile terminals; however, the embodiments are not limited thereto. For example, the UEs may represent vehicles, infrastructures, or the like depending on scenarios or situations.

In FIG. 9A, the transmitting UE (UE 1) may select a resource unit corresponding to a specific resource within a resource pool including a set of resources, and transmit a sidelink signal using the resource unit. The receiving UE (UE 2) may be configured with a resource pool over which the UE 1 is allowed to transmit a signal and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitting UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitting UE to transmit information, such as an ID of the transmitting UE, or the like, and a neighboring UE to discover the transmitting UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitting UE or whether a transmitting UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
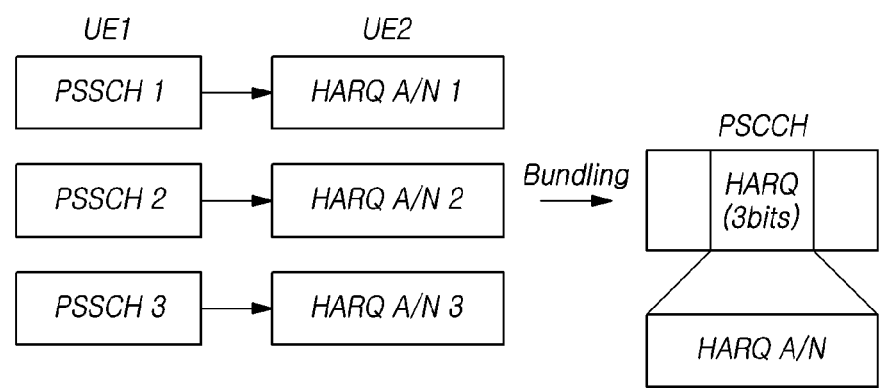
FIG. 10 illustrates a method of bundling and transmitting HARQ feedback information in the V2X.

FIG. 10 illustrates a method of bundling and transmitting HARQ feedback information in the V2X;

Referring to FIG. 10, in the LTE V2X, separate HARQ ACK/NACK information is not transmitted in order to reduce system overhead, and data are allowed to be retransmitted once according to discretion of a transmitting UE for data transmission safety. However, in the NR V2X, in terms of data transmission stability, HARQ ACK/NACK information may be transmitted. In this case, overhead may be reduced by bundling and transmitting the corresponding information.

That is, when a transmitting UE (UE1) transmits three data transmissions to a receiving UE (UE2), and then the receiving UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource assignment modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
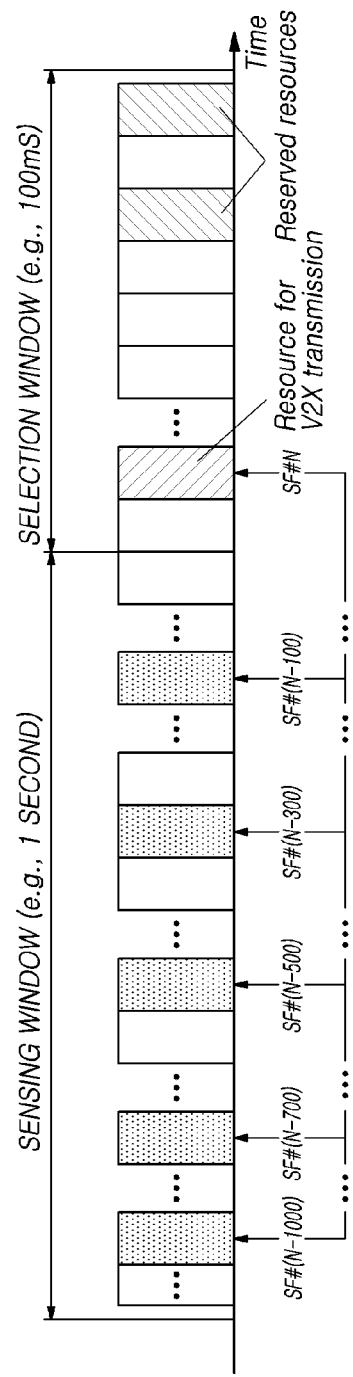

FIGS. 11A and 11B illustrate a type of a V2X transmission resource pool;

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool allowing a random selection only. In V2X transmit resource pool #B, a UE does not perform partial sensing, and the UE may randomly select a V2X transmission resource in a selection window.

As one example, unlike a resource pool allowing partial sensing only, in a resource pool allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 12:
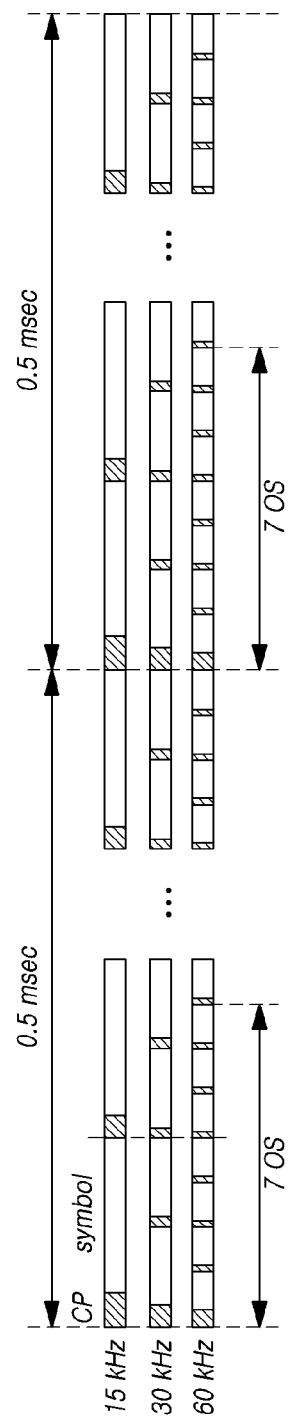
FIG. 12 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
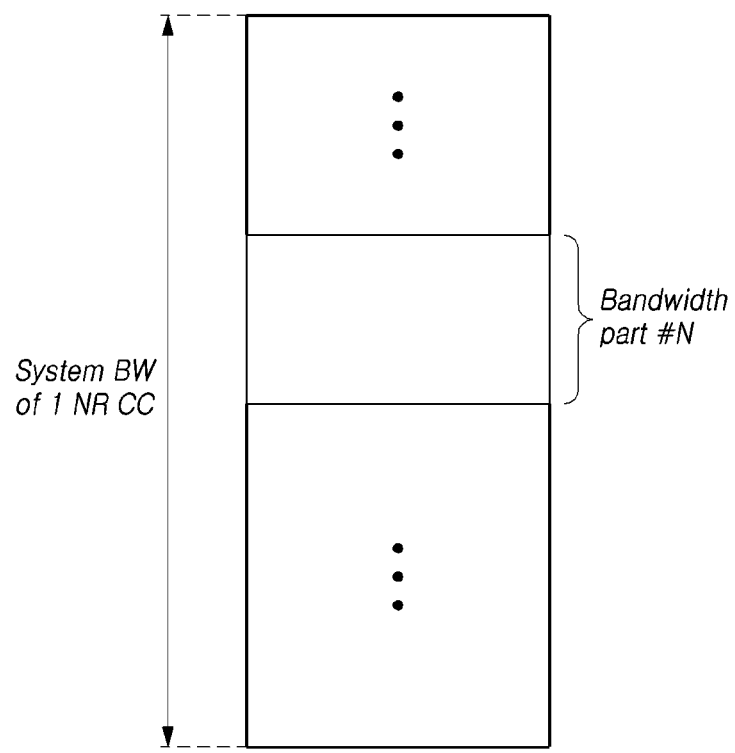
FIG. 13 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

A Method of Assigning a HARQ ACK/NACK Feedback Resource

According to a PUCCH resource assignment method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

On the other hand, in the typical 3GPP LTE, the sidelink may support the V2X communication, which is a concept of fusion of, a device-to-device (D2D) communication, an vehicle-to-vehicle (V2V) communication, and a vehicle-to-base station (V2I: vehicle to infrastructure) communication. The transmission/reception method for the sidelink is standardized as an additional feature. In more details, the D2D is a service scenario that assumes communication between existing devices/terminals in a mutually equal relationship. V2V is an extended vehicle-to-vehicle communication service scenario that assumes a wireless communication environment between general pedestrians and vehicle terminals with different characteristics. In order to successfully utilize radio resources with or without the assistance of a base station, various technologies have been standardized in initial access and resource allocation.

In the NR, there are studies in progress for V2X related standardization for supporting the sidelink and satisfying changed service requirements, and the following four new service scenarios are introduced.

Vehicles Platooning enables vehicles to dynamically form platoons that move together. All vehicles included in a platoon acquire information from a leading vehicle to manage the platoon. This information enables vehicles i) to drive with more being adjacent to one another in a coordinated manner compared to a normal situation and ii) to move in the same direction together.

Extended Sensors enable raw or processed data collected via local sensors or live video images to be exchanged between vehicles, road site devices, pedestrian devices and V2X application servers. As a result, vehicles are able to raise environmental awareness beyond what their sensors can detect and have a broader and holistic view for a corresponding local situation. The high rate of data transmission is one of main features of this service scenario.

Advanced Driving enables semi-automatic or fully automatic driving. This service scenario enables each vehicle and/or road side unit (RSU) to share its own perception data obtained from local sensors with nearby vehicles and vehicles to synchronize and adjust trajectories or maneuvers. Each vehicle shares a driving intention with nearby driving vehicles.

Remote Driving enables a remote driver or a vehicle-to-everything (V2X) application to drive i) a vehicle in a hazardous environment or ii) a remote vehicle for passengers which cannot drive on its own. For example, driving based on cloud computing may be used when variations are limited and routes are predictable as in the public transportation. High reliability and low latency are main requirements of this scenario.

Meanwhile, in the NR V2X, an agreement has been tentatively reached on supporting Mode 1 in which a base station manages communication resources between UEs and Mode 2 in which communication resources are managed by communication between UEs. In particular, in Mode 2, an agreement has been reached on the following four transmission types, and respective types have been represented as Mode 2-(a)~Mode 2-(d) or Mode 2a~Mode 2d.

Mode-2a: A UE autonomously selects sidelink resource for transmission.

Mode-2b: The UE assists sidelink resource selection for other UE(s).

Mode-2c: The UE is configured with NR configured grant (type-1 like) for sidelink transmission.

Mode-2d: The UE schedules sidelink transmissions of other UEs.

However, an agreement has been reached that the Mode-2b for transmitting subsequent channel configuration assistant information is defined as additional functions of the other three modes, and therefore, it will not be operated any longer as a single mode.

In the case of the LTE, the mode is divided into Mode 1 and Mode 3 when the base station manages communication resources between the UEs, and the mode is divided into Mode 2 and Mode 4 when the UE autonomously manages communication resources.

The sidelink transmission procedure of LTE Mode 1 is described in below.

1) The base station configures a resource pool for transmission of the PSCCH to all UEs. The resource pool is divided into regions (1×4=4 RB in total) which are made up of two subframes and 1 RB bandwidth as a unit, and an index of 6 bits is allocated to each region. At this time, the index is allocated only in the upper half band of the resource pool, and all sidelink UEs repeatedly transmit the same SCI at the same position in the lower half band (total 8 RB).

2) When the UE transmits a scheduling request (SR) through the PUCCH to the base station, the base station transmits the PSCCH index of 6 bits and time/frequency resource information of the data region through the PDCCH with DCI Format 5.

3) The UE transmits the message with SCI format 0 through the PSCCH resource indicated by the 6 bit based on the received information. At this time, the data region resource inside the message uses the information received with DCI Format 5. In addition, the UE transmits the data to be transmitted by mapping it to a corresponding data region resource after encoding it by using an MCS value selected by itself or configured by the RRC.

4) Other UEs continue to search inside the resource pool for the transmission of the PSCCH. When they detect the PSCCH transmitted by the user they want, they detect the data area resource location, the MCS and the like based on the corresponding SCI message and perform the sidelink reception.

The sidelink transmission procedure of LTE Mode 2 is described in below.

1) The base station configures the resource pool for transmission of the PSCCH in the Mode 2 to all UEs. The structure of this resource pool is the same as that in Mode 1.

2) The UE confirms whether a specific PSCCH resource region is used through sensing. Then, confirming that the specific PSSCH resource region is empty through separate sensing, the UE transmits message with an SCI format 0 indicating the empty PSSCH resource region through the empty PSCCH. At this time, the data region resource inside the message follows the resource area selected by itself. The UE encodes the data to be transmitted using the MCS value selected by itself, and then transmits the data by mapping it to a corresponding data region resource.

3) The procedure for other UEs to receive the corresponding region is the same as that in Mode 1.

The sidelink transmission procedure of LTE Mode 3 is described in below.

1) The base station configures the resource pool for transmission of the PSCCH to all UEs. At this time, the PSCCH may be configured to be adjacent to or independent on the PSSCH indicated by the PSCCH. When the PSCCH may be configured to be r independent on the PSSCH, it is similar to LTE Mode 1. The resource pool is divided into regions which are made up of one subframe and two consecutive RB regions (2×2=4 RB in total), and an index of k bits is allocated to each region. Here, k is dependent on the bandwidth size of the configured resource pool. When the PSCCH and the PSSCH indicated by the PSCCH are configured to be adjacent, a band of the configured resource pool is frequency-divided into subchannels having a minimum RB unit size of at least 4, and the bottom two RBs of each subchannel are PSCCH transmission candidate regions (2×2=4 RB in total), and an index made up of k bits is allocated to them. Here, k is dependent on the bandwidth of the configured resource pool, that is, the number of subchannels. In the case of the Mode 3, the SCI is not repeatedly transmitted.

2) When the UE transmits the scheduling request (SR) through the PUCCH to the base station, the base station transmits the k-bit PSCCH index and time/frequency resource information of the data region with DCI format 5 through the PDCCH.

3) The UE transmits the message with SCI format 1 through the PSCCH resource indicated by the k-bit based on the received information. At this time, the data region resource inside the message uses the information received with DCI Format 5. The data to be sent is mapped to the corresponding data region resource and then transmitted through it.

4) The subsequent procedure is the same as that in the Mode 1.

The sidelink transmission procedure in LTE Mode 4 is described in below.

Basically a resource pool type is the same as that in the Mode 3, and the transmission method is the same as that in the Mode 2. However, the SCI additionally includes i) a message that can reserve a resource by configuring a specific time resource and ii) a priority message that can manage QoS.

In the NR V2X, it has been requested to support the sidelink transmission/reception based on the unicast or the groupcast, as well as the above-mentioned broadcast.

When the sidelink transmission/reception method based on the unicast or the groupcast is defined as a form of NR-based V2X communication, it is necessary to define a method of applying HARQ to a corresponding sidelink radio channel. The HARQ ACK/NACK message for a specific message may be transmitted through the physical sidelink feedback channel (PSFCH). In this case, the last symbol(s) of the slot may be used as the location of the corresponding PSFCH. The PSFCH region may be defined for every slot such as every N slots where N is greater than 1. However, a specific indication method, a resource region other than the last symbol, and a method of transmitting a feedback message excluding the HARQ have not been discussed yet.

Downlink control information (DCI) includes a message or a field for transmitting information related to modulation and coding scheme (MCS) used in a data area to be transmitted in the form of a table index. It uses all 5 bits except for the case of LTE 1024QAM, so it is defined in the specification in the form of the table having 31 indexes. The MCS table used by the user equipment is defined in 3GPP TS 36.213, and one of Table 8.6.1-1 to Table 8.6.1-3 in the 3GPP TS 36.213 is used depending on whether the user equipment is supported. Which MCS table the user equipment selects is configured in advance through the RRC by the base station in consideration of the capability of the user equipment.

However, one user equipment does not know the other user equipment's a RRC configured value based on the sidelink control information (SCI). Accordingly, it is necessary to transfer information related to the MCS table used. In the case of the LTE, by using only table 8.6.1-1 in the 3GPP TS 36.213, MCS information could be transmitted between transmitter and receiver without prior transmission of information related to the MCS table used for SCI transmission.

In the case of the NR, more tables are defined in the specification to support pi-2-BPSK and URLLC environments. Even if the user equipment is limited to use, 5 tables of table 5.1.3.1-1, 5.1.3.1-2, 5.1.3.1-3, 6.1.4.1-1, and 6.1.4.1-2 of the 3GPP TS 38.214 are defined. In the case of table 6.1.4.1-1 and 6.1.4.1-2, the modulation method can be selected from pi-2-BPSK or QPSK according to the RRC configuration at a low index, so there are actually 7 MCS tables in the case of the NR.

Unlike typical communication between a base station to a user equipment, sidelink communication does not share the RRC value configured between the user equipments. Therefore, when there are a plurality of MCS tables to be used, it is impossible for the receiving user equipment to know which MCS table is selected among them by the transmitting user equipment without other transmission paths. In addition, many MCS tables have similar configurations, and even if they are incorrectly recognized as different tables, only a result of a performance degradation occurs, and thus it is often impossible to discriminate by blind detection. Therefore, there is a need to agree in advance on the MCS table to be used between the user equipments.

In order to solve this problem, LTE V2X introduced a method of using a single MC table by all user equipments. However, in the case of NR V2X, a number of scenarios requiring URLLC characteristics are considered. For example, unlike the LTE V2X, a URLLC transmission environment may also be supported in a general eMBB environment in the NR V2X. Therefore, it is considered that it is necessary to introduce and use at least one MCS table defined for a general environment and another MCS table defined for a URLLC environment in the sidelink communication. However, there has not been discussed a method for transmitting an MCS table selection information that enables a receiving user equipment to know which MCS table the transmitting user equipment has selected and how it transmit the information on the selected MCS table.

Hereinafter, a method of transmitting and receiving information regarding modulation and demodulation user equipment used in the sidelink communication will be described with reference to related drawings.

In the present disclosure, a transmitting or transmitter user equipment (Tx UE) means an user equipment or a terminal that transmits the PSCCH and the corresponding PSSCH to a receiving user equipment through the sidelink. In addition, a receiving or receiver user equipment (Rx UE) means an user equipment or a terminal that receives the PSCCH and the corresponding PS SCH from the transmitting user equipment 1 through the sidelink.

Figure 14:
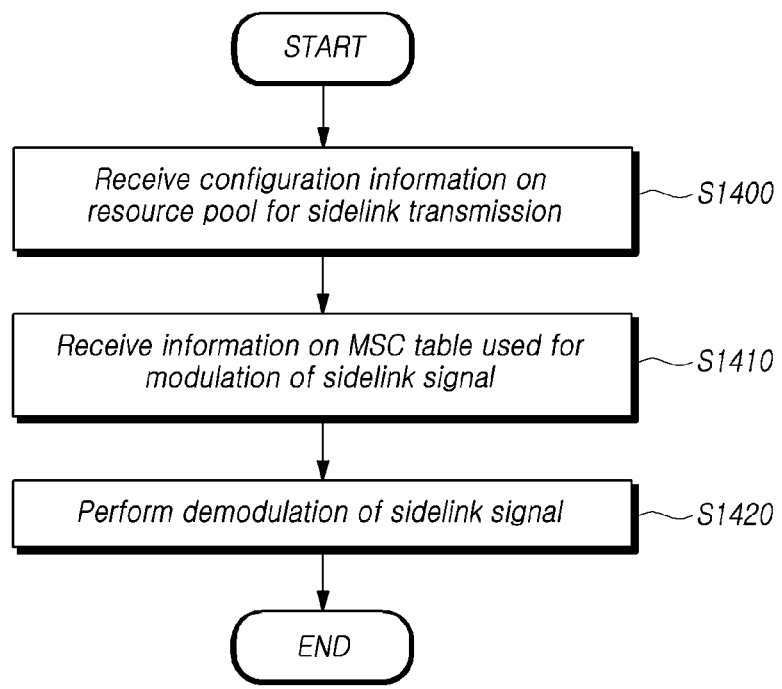
FIG. 14 is a flow diagram illustrating a procedure of a receiving user equipment for receiving information on an MCS table used for modulation of a sidelink signal according to an embodiment.

FIG. 14 is a flow diagram illustrating a procedure of a receiving user equipment for receiving information on an MCS table used for modulation of a sidelink signal according to an embodiment.

Referring to FIG. 14, the receiving user equipment receives configuration information on a resource pool used for sidelink transmission at S1400.

The base station may configure the resource pool on radio resources for sidelink transmission and reception between the user equipment and other user equipments. Here, the resource pool may be a radio resource to be used to transmit and receive the PSCCH, the PSSCH, etc. between the user equipment and other user equipments. The receiving user equipment may receive the configuration information on the resource pool from the base station through higher layer signaling.

Hereinafter, embodiments will be described based on mode 2 in which the base station configures the resource pool for the sidelink and the user equipments manage the radio resource through the sidelink communication between them. However, the embodiments are not limited thereto. For example, the embodiments can be applied substantially the same for the case of mode 1 in which the base station performs scheduling for the sidelink transmission.

Referring to FIG. 14 again, the receiving user equipment receives information on an MCS table used for modulation of the sidelink signal among at least one MCS table for the resource pool based on the configuration information at S1410.

The receiving user equipment receives information on an MCS for demodulating and decoding the sidelink signal received from the transmitting user equipment. The information on the MCS may include information on the MCS table which includes modulation order (Qm) and code rate (R) used to encode and modulate the sidelink signal.

As an example, the information on the MCS may be included in the configuration information for the resource pool configured between the transmitting user equipment and the receiving user equipment for the sidelink transmission. That is, when configuring the resource pool, the base station transmits to the transmitting user equipment and the receiving user equipment the information on a set or group of the MCS table including at least one MCS table that may be applied to the sidelink signal transmitted and received using the resource pool together with the configuration information for the resource pool. The MCS table set may include a plurality of the MCS tables.

As another example, the base station may transmit information on the MCS table set that may be used for the sidelink transmission between specific user equipments through RRC signaling. Accordingly, the information on the MCS table set may be configured for each user equipment, where the MCS table set includes the plurality of the MCS tables used for transmission and reception of the sidelink signal within the corresponding resource pool between user equipments.

For example, the MCS table set may include at least one table selected among three MCS tables including modulation order (Qm) and code rate (R) for a PSSCH (Physical Sidelink Shared Channel) according to an MCS index for the resource pool. The three MCS tables may be defined. The number of the defined MCS tables may be three as an example, but it is not limited thereto. For example, the number of the defined MCS tables may vary.

As an example, the MCS table set may include at least one MCS table that may be used for the sidelink transmission in the configured resource pool among three MCS tables defined in the 3GPP TS 38.213: table 5.1.3.1-1, table 5.1.3.1-2, and table 5.1.3.1-3, between the transmitting user equipment and the receiving user equipment. That is, among three MCS tables, a subgroup including the MCS table to be used for the sidelink transmission in the resource pool may be indicated to the receiving user equipment through RRC signaling.

As another example, when receiving the sidelink signal from the transmitting user equipment, the receiving user equipment receives through the sidelink control information (SCI) the information on the MCS table used for modulation of the corresponding sidelink signal among the MCS table set. To this end, the SCI may include specific field such as an MCS delivery field including information indicating the corresponding MCS table.

As an example, the SCI may be a 1st-stage SCI consisting of SCI format 0-1, and be used for scheduling the PSSCH and a 2nd-stage SCI for the PSSCH. In this case, the SCI may further include a 5-bit MCS field indicating any one of 32 MCS indexes in the corresponding MCS table.

As an example, the information on the MCS table is provided by the SCI comprising scheduling information for the PSSCH, but it is not limited thereto. The information indicating the MCS table may be transmitted through an SCI different from the SCI to which information on the MCS index or scheduling information for the PSSCH is transmitted.

As another example, when receiving the sidelink signal from the transmitting user equipment, the information on the MCS table used for the modulation of the sidelink signal among the MCS table set may be indicated through the higher layer signaling. For example, the receiving user equipment may receive information on the MCS table through PC5 RRC signaling.

As still another example, the information on the MCS table used for modulation of the corresponding sidelink signal among the MCS table set may be received differently according to a mode of sidelink transmission. For example, in the mode 1, the information on the MCS table is indicated through the higher layer signaling, and in the mode 2, information on the MCS table may be transmitted by the SCI.

As mentioned above, the information on the MCS table used for the sidelink transmission may be received from the transmitting user equipment. The first step is to indicate through the higher layer signaling such as the RRC the MCS table set that may be used in the resource pool when configuring the resource pool for the sidelink transmission. The second step is to indicate the MCS table used for the actual sidelink transmission signaling among the indicated MCS table through the SCI or the PC 5 higher layer.

Referring to FIG. 14 again, the receiving user equipment performs demodulation on the received sidelink signal based on the information on the received MCS table at S1420.

The receiving user equipment may receive the sidelink signal such as the PSCCH or the PSSCH from the transmitting user equipment. In order to check the data included in the received sidelink signal, the receiving user equipment may check the indicated MCS table according to the information on the MCS table among the set of MCS tables. The receiving user equipment may demodulate and decode the received sidelink signal, based on the modulation order and code rate information corresponding to the MCS index received by the SCI in the indicated MCS table.

According to the above-mentioned embodiment, it is possible to provide the specific method and the apparatus capable of transmitting and receiving information required to modulate and demodulate the signal transmitted from the sidelink in the case of NR V2X necessary for using a number of the MCS tables in the sidelink communication.

Figure 15:
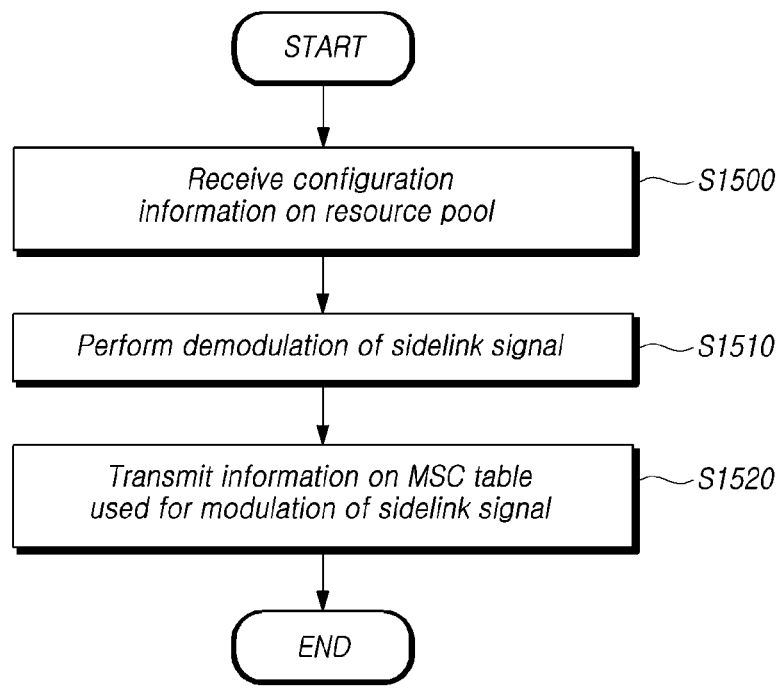
FIG. 15 is a flow diagram illustrating a procedure of a transmitting user equipment for transmitting the information on the MCS table used for the modulation of the sidelink signal according to other embodiment.

FIG. 15 is a flow diagram illustrating a procedure of a transmitting user equipment for transmitting the information on the MCS table used for the modulation of the sidelink signal according to an embodiment.

Referring to FIG. 15, a transmitting user equipment receives configuration information on a resource pool used for sidelink transmission at S1500.

The base station may configure the resource pool on radio resources for sidelink transmission and reception between the user equipment and other user equipments. Here, the resource pool may be a radio resource to be used to transmit and receive the PSCCH, the PSSCH, etc. between the user equipment and other user equipments. The receiving user equipment may receive the configuration information on the resource pool from the base station through higher layer signaling.

Hereinafter, embodiments will be described based on mode 2 in which the base station configures the resource pool for the sidelink and the user equipments manage the radio resource through the sidelink communication between them. However, the embodiments will not limited thereto. For example, the embodiments can be applied substantially the same for the case of mode 1 in which the base station performs scheduling for the sidelink transmission.

Referring to FIG. 15 again, the transmitting user equipment performs modulation of a sidelink signal by using an MCS table among at least one MCS table for the resource pool based on the configuration information at S1510.

The transmitting user equipment receives information on an MCS for demodulating and decoding the sidelink signal from the base station. The information on the MCS may include information on the MCS table which includes modulation order (Qm) and code rate (R) used to encode and modulate the sidelink signal.

As an example, the information on the MCS may be included in the configuration information for the resource pool configured between the transmitting user equipment and the receiving user equipment for the sidelink transmission. That is, when configuring the resource pool, the base station transmits to the transmitting user equipment and the receiving user equipment the information on a set or group of the MCS tables including at least one MCS table that may be applied to the sidelink signal transmitted and received using the resource pool together with the configuration information for the resource pool. The MCS table set may include a plurality of the MCS tables.

As other example, the base station may transmit information on the MCS table set that may be used for the sidelink transmission between specific user equipments through RRC signaling. Accordingly, the information on the MCS table set may be configured per each user equipment, where the MCS table set includes the plurality of the MCS tables that may be used for transmission and reception of the sidelink signal within the corresponding resource pool between user equipments.

For example, the MCS table set may include at least one table selected among three MCS tables including modulation order (Qm) and code rate (R) for a PSSCH (Physical Sidelink Shared Channel) according to an MCS index for the resource pool. The three MCS tables may be defined. The number of the defined MCS tables may be three as an example, but it is not limited thereto. For example, the number of the defined MCS tables may vary As an example, the MCS table set may include at least one MCS table that may be used for the sidelink transmission in the configured resource pool among three MCS tables defined in the 3GPP TS 38.213: table 5.1.3.1-1, table 5.1.3.1-2, and table 5.1.3.1-3, between the transmitting user equipment and the receiving user equipment. That is, among three MCS tables, a subgroup including the MCS table to be used for the sidelink transmission in the resource pool may be indicated to the receiving user equipment through RRC signaling.

As an example, when transmitting the sidelink signal to the receiving user equipment, the transmitting user equipment may determine the MCS table used for modulation of the corresponding sidelink signal among the MCS table set. For example, the transmitting user equipment may determine the MCS table among the MCS table set based on at least one of its power status, its capability, or state of the sidelink channel, etc.

The transmitting user equipment may determine an MCS index corresponding to modulation order and the code rate to be used for transmission of the sidelink signal from the determined MCS table. The transmitting user equipment may encode and modulate the sidelink signal based on the corresponding modulation order (Qm) and the code rate (R). Thereafter, the transmitting user equipment may transmit the modulated sidelink signal to the receiving user equipment.

Referring to FIG. 15 again, the transmitting user equipment transmits information on the MCS table used for the modulation of the sidelink signal among the at least one MCS table at S1520.

As an example, the transmitting user equipment may transmits through the SCI the information on the MCS table used for modulation of the corresponding sidelink signal among the MCS table set. To this end, the SCI may include specific field such as an MCS delivery field including information indicating the corresponding MCS table.

As an example, the SCI may be a 1st-stage SCI consisting of SCI format 0-1, and be used for scheduling the PSSCH and a 2nd-stage SCI for the PSSCH. In this case, the SCI may further include a 5-bit MCS field indicating any one of 32 MCS indexes in the corresponding MCS table.

As an example, the information on the MCS table is provided by the SCI having scheduling information for the PSSCH, but it is not limited thereto. The information indicating the MCS table may be transmitted through an SCI different from the SCI to which information on the MCS index or scheduling information for the PSSCH is transmitted.

As mentioned above, the information on the MCS table used for the sidelink transmission may be transmitted to the receiving user equipment through the following two steps. The first step is to indicate through the higher layer signaling such as the RRC the MCS table set that may be used in the resource pool when configuring the resource pool for the sidelink transmission. The second step is to indicate the MCS table used for the actual sidelink transmission signaling among the indicated MCS table through the SCI or the PC 5 higher layer.

The receiving user equipment may receive the sidelink signal such as the PSCCH or the PSSCH from the transmitting user equipment. In order to check the data included in the received sidelink signal, the receiving user equipment may check the indicated MCS table according to the information on the MCS table among the set of MCS tables. The receiving user equipment may demodulate and decode the received sidelink signal, based on the modulation order and code rate information corresponding to the MCS index received by the SCI in the indicated MCS table.

According to the above-mentioned embodiment, it is possible to provide the specific method and the apparatus capable of transmitting and receiving information required to modulate and demodulate the signal transmitted from the sidelink in the case of NR V2X necessary for using a number of the MCS tables in the sidelink communication.

Hereinafter, each embodiment capable of transmitting and receiving information required to modulate and demodulate the signal transmitted from the sidelink in the NR will be described in detail with reference to the related drawings.

In the present disclosure, there is provided a method of transmitting MCS information of a transmission signal to the receiving user equipment in an NR sidelink transmission/reception environment. Particularly, in an environment in which various types of MCS tables are used, there is provided a method for transmitting the information on the MCS table selected for the sidelink transmission to the receiving user equipment.

The present disclosure introduces (1) a method for allowing a base station to configure the MCS table to be used for the PSSCH transmission in advance as first embodiment, and (2) a method for allowing the transmitting user equipment to determine the MCS table to be used for the PSSCH transmission as second embodiment. In the present disclosure, for convenience of description, it will be described as being divided into only two MCS tables, but is not limited thereto. The embodiments may be applied substantially the same even when introducing three or more MCS tables.

First Embodiment: Method for Allowing a Base Station to Configure the MCS Table to be Used for the PSSCH Transmission in Advance In the present embodiment, the MCS table is initially determined at the procedure of RRC configuration for the sidelink transmission resource configuration.

In the related art, the base station indicates the MCS table to be used for each situation by the RRC. In the method according to the present embodiment, a base station indicates a MCS table to be used for a specific resource in advance, so that any user equipment accessing the corresponding resource for transmission/reception recognizes the same MCS table. In detail, the method may include a step for indicating the MCS table when configuring the resource pool for the sidelink resource region and a step for dividing each SCI resource.

As an example, the MCS table to be used for the sidelink transmission and reception may be indicated when configuring the resource pool. That is, when configuring the resource pool through the RRC, the MCS table to be used when transmitting/receiving the SCI and accompanying sidelink through the resource pool may be configured together through the RRC.

For example, the MCS table for the resource pool in which a transmission region is configured in a large unit for transmitting large data and the MCS table for the resource pool in which a transmission region is densely configured in a small unit for URLLC packet transmission. The base station may transmit the same MCS table value to each user equipment for the same resource pool, so that the user equipment can transmit and receive the sidelink signal through the resource pool using the same MCS table.

As other example, the MCS table to be used for the sidelink transmission and reception may be limited according to the resource region used for the sidelink transmission. That is, by dividing the resource regions transmitted through the sidelink, a resource region using a specific MCS table and a resource region using a different MCS table may be separated.

For example, each resource region may be temporally separated through slots or frame numbers or separated in frequency. Particularly, when the resource pool is configured, a part of the regions in the resource pool may be together configured in a designated format. The limited resource region may be a resource region for the PSCCH or a resource region for the PSSCH. In the former case, data scheduled in the corresponding region follows the corresponding MCS table, and in the latter case, data scheduled in the corresponding region does not follow the corresponding MCS table. Also, in the former case, there may exist a PSCCH region configured with a plurality of different MCS tables. When one PSCCH region is used, the remaining PSCCH may be regarded as a PSSCH region and transmitted.

As described above, when the MCS table is limited according to a resource region used for the sidelink transmission, the PSCCH location is configured to be arranged at P resource block (RB) intervals when configuring the resource pool. The SCI transmitted through every P-th resource block (RB) may be pre-configured to use the first MCS table. In addition, for any natural number k less than or equal to P/2, the SCI transmitted through every P+k th RB may be pre-configured to use the second MCS table.

In this case, assume that the number of RBs in which one SCI is transmitted is r. When a SCI is transmitted to the P-th RB, the PSSCH may be mapped to the P-r regions including the remaining P+k-th RBs without transmitting the SCI. Similarly, when the SCI is transmitted to the P+k th RB, the PSSCH may be mapped to the P-r regions including the remaining P-th RB without transmitting the SCI. The receiving user equipment divides the two into the RB.

Figure 16:
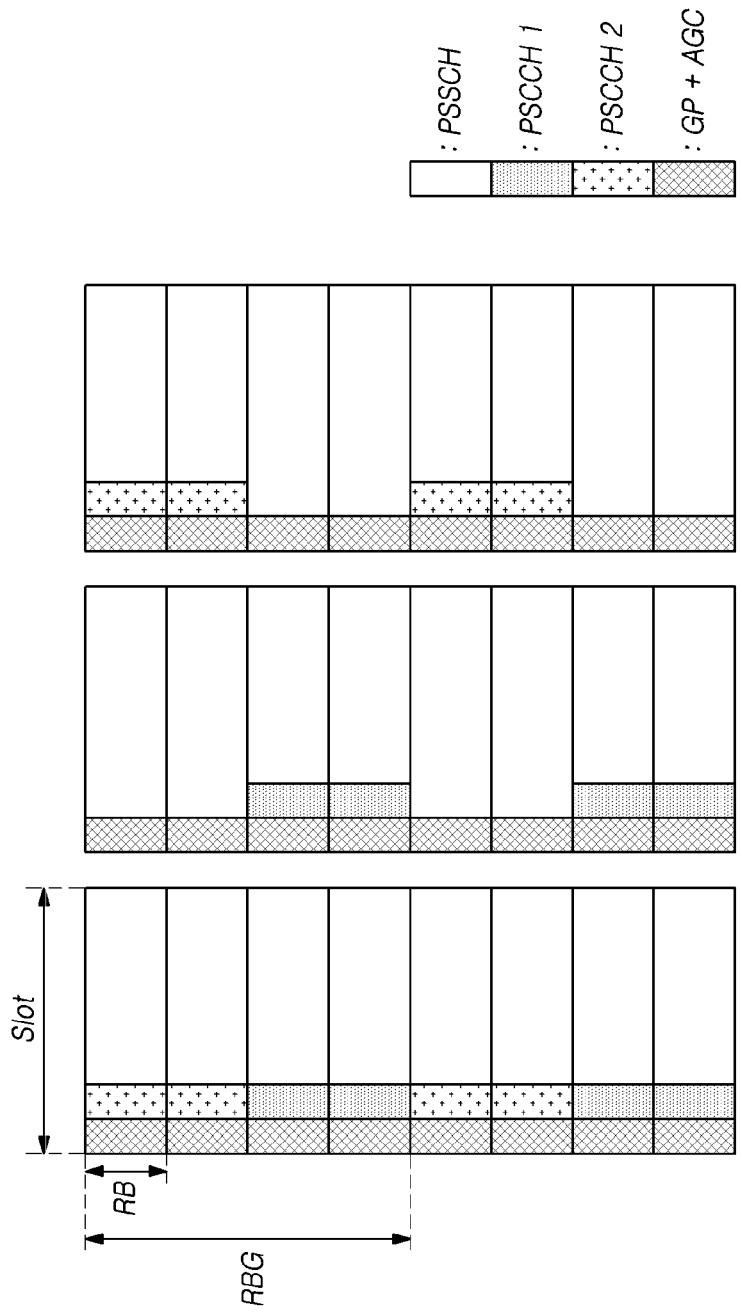
FIG. 16 illustrates an example of the MCS table applied to different SCI resources according to a first embodiment.

FIG. 16 illustrates an example of the MCS table applied to different SCI resources according to a first embodiment.

Referring to FIG. 16, the SCI transmitted on PSCCH 1 indicates an MCS value using an MCS table for the eMBB transmission, and the SCI transmitted on PSCCH 2 indicates an MCS value using an MCS table for the URLLC transmission.

Second Embodiment: Method for Allowing the Transmitting User Equipment to Determine the MCS Table to be Used for the PSSCH Transmission In this embodiment, the transmitting user equipment directly transmits the MCS table which is selected or will be selected by itself when transmitting the sidelink signal. The embodiments may include i) a method of transmitting the information on the MCS table through the SCI and ii) a method of transmitting statically the information on the MCS table through the data region and the like.

As an example, an MCS table to be used for the sidelink transmission and reception may be inserted into an SCI message and transmitted. For example, In the SCI, a region for transmitting the MCS table referenced by a specific field such the MCS delivery field of the corresponding SCI may be configured. Alternatively, after the base station configure the user equipment with different RNTIs in advance, the information on the MCS table may be implicitly transmitted by scrambling a CRC and a specific RNTI among the configured different RNTIs for each situation or circumstance.

In the present disclosure, in the 2-stage form as described below, the base station determines the MCS table set that may be used in a specific region by the RRC, and the user equipment transmits the information on the MCS table which of the MCS table set is actually used through the SCI.

FIG. 17 illustrates an example of the SCI including the information on the MCS table according to a second embodiment.

Referring to FIG. 17, as an example, the SCI may include the MCS delivery field in which the information indicating the MCS table is transmitted. As shown in FIG. 17, the SCI may further include information on at least one of MCS index or PSSCH scheduling information in the corresponding MCS table. As other example, the information indicating the MCS table may be transmitted through the SCI different from the SCI including information on MCS index or the PSSCH scheduling information.

As described above, while the resource regions are divided and used in advance according to the usage or purpose, the user equipments having different capacities may dynamically select an optimal transmission environment in consideration of its power condition and capability in a transmission environment that is equally matched between the user equipments for the sidelink transmission.

At this time, when the indication for the MCS table is configured as a message field, the number of additional SCI bits required may vary according to the size of the MCS table set. In this case, the length of the SCI payload may be fixed according to the maximum size of the MCS table set, or the length of the SCI payload may be variable according to the configured MCS table set.

Among the MCS tables defined in the 3GPP TS 38.213, the MCS tables 6.1.4.1-1 and 6.1.4.1-2 distinguish whether the modulation method of multiple indexes corresponding to the low index is pi-2-BPSK or QPSK according to whether the user equipment uses pi-2-BPSK. As an example, the base station may deliver the eMBB region using the MCS table 6.1.4.1-1 and the URLLC region using the MCS table 6.1.4.1-2 through the RRC. In the region defined to use either the MCS table 6.1.4.1-1 or the MCS table 6.1.4.1-2, the user equipment may indicate whether it uses pi-2-BPSK for the sidelink transmission through the SCI.

Among the MCS tables defined in the 3GPP TS 38.213, the MCS tables 5.1.3.1-1 and 5.1.3.1-2 are the MCS tables for the eMBB transmission, but are used for 64QAM and 256QAM, respectively, according to the capability of the user equipment. As another example, the base station may indicate the eMBB region using the MCS tables 5.1.3.1-1 or 5.1.3.1-2 and the URLLC region using the MCS table 5.1.3.1-3 through the RRC.

In the region defined to use one of the MCS tables 5.1.3.1-1 or 5.1.3.1-2 for the eMBB transmission, the user equipment may indicate whether it uses 256QAM for the sidelink transmission through the SCI. When the user equipment transmits the sidelink signal through the region defined to use the MCS table 5.1.3.1-3 for the URLLC transmission, the corresponding SCI field is not used and is fixed to a specific value, or if the corresponding information is defined as a message field, there may be used the SCI format in which it is truncated and the length of the SCI payload is changed.

As another example, the information on the MCS table to be used for the sidelink transmission and reception may be statically transmitted to the target user equipment. In a unicast and a groupcast environments, when continuous transmission/reception is assumed after a sidelink connection between specific user equipments is established, the information on the MCS table to be used in the specific sidelink may be transmitted. In this case, in the first connection, the original MCS table configured by the base station is used, and then the information on the MCS table to be used later may be transmitted to the target user equipment through the PSSCH or the like.

In this case, information such as the RNTI, information on effective time of the corresponding configuration, and information on limited resource region when the corresponding MCS table is applied may be transmitted together in order to accurately classify the SCI to which the corresponding change is applied. The related information may simultaneously define a plurality of MCS tables, and information such as the RNTI or the resource region to be mapped to each MCS table can be transmitted together to dynamically select and use one of these MCS tables.

The embodiments of the present disclosure improve the efficiency and the quality of the sidelink transmission compared to the existing environment using only a single MCS table by flexibly changing and applying different MCS table optimized for each transmission type according to the sidelink environment.

Hereinafter, the UE and the base station capable of performing a part or all of the embodiments described with reference to FIG. 1 to FIG. 17 will be discussed with reference to accompanying drawings.

Figure 18:
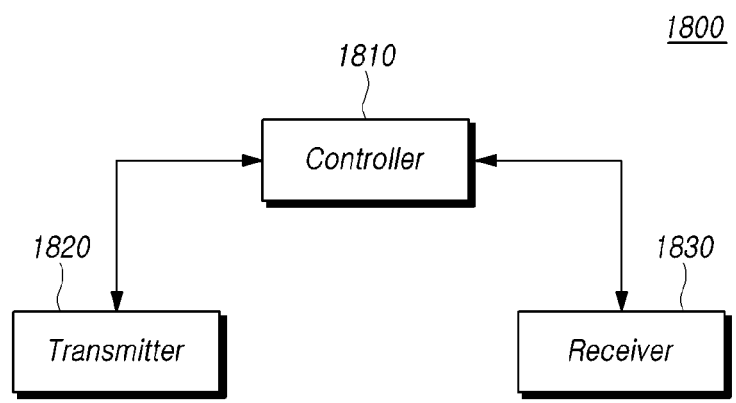
FIG. 18 is a block diagram illustrating a transmitting user equipment in accordance with an embodiment.

FIG. 18 is a block diagram illustrating a receiving UE 1800 in accordance with an embodiment.

Referring to FIG. 18, the receiving UE 1800 in accordance with an embodiment includes a controller 1810, a transmitter 1820, and a receiver 1830.

The controller 1810 controls overall operations of the UE 1800 according to methods for allowing the receiving UE to receive the information on the modulation and the demodulation for the sidelink transmission, needed to perform the embodiments of the present described above. The transmitter 1820 transmits UL control information, data, and messages, etc. to the base station over a corresponding channel, and transmits sidelink control information, data, and messages etc. to a receiving UE over a corresponding channel. The receiver 1830 receives DL control information, data, and messages, etc. from the base station over a corresponding channel, and receives sidelink control information, data, and messages etc. from the receiving UE over a corresponding channel.

The receiver 1830 may be configured to receive the configuration information on a resource pool for the sidelink transmission. The base station may configure the resource pool on the radio resources for the sidelink transmission and reception between the UE and other UEs. The receiver 1830 may receive the configuration information on the resource pool through the higher layer signaling. Here, the resource pool may be the radio resource configured to be used to transmit and receive the PSCCH, the PSSCH and the like between the UE and other UEs. The UE 1800 may receive the configuration information for the resource pool from the base station through higher layer signaling.

The receiver 1830 receives information on an MCS table used for modulation of the sidelink signal among at least one MCS table for the resource pool based on the configuration information. The receiver 1830 receives information on an MCS for demodulating and decoding the sidelink signal received from the transmitting UE. The information on the MCS may include information on the MCS table which includes modulation order (Qm) and code rate (R) used to encode and modulate the sidelink signal.

As an example, when configuring the resource pool, the base station transmits to the transmitting user equipment and the receiving user equipment the information on a set or group of the MCS tables including at least one MCS table that may be applied to the sidelink signal transmitted and received using the resource pool together with the configuration information for the resource pool. As other example, the base station may transmit information on the MCS table set that may be used for the sidelink transmission between specific user equipments through RRC signaling.

For example, the MCS table set may include at least one table selected among three MCS tables including modulation order (Qm) and code rate (R) for a PSSCH (Physical Sidelink Shared Channel) according to an MCS index for the resource pool. The three MCS tables may be defined. The number of the defined MCS tables may be three as an example, but it is not limited thereto. For example, the number of the defined MCS tables may vary.

As an example, the MCS table set may be composed of at least one MCS table that may be used for the sidelink transmission in the configured resource pool among three MCS tables defined in the 3GPP TS 38.213: table 5.1.3.1-1, table 5.1.3.1-2, and table 5.1.3.1-3, between the transmitting user equipment and the receiving user equipment. That is, among three MCS tables, a subgroup including the MCS table to be used for the sidelink transmission in the resource pool may be indicated to the receiving user equipment through RRC signaling.

As an example, when receiving the sidelink signal from the transmitting user equipment, the receiver 1830 receives through the sidelink control information (SCI) the information on the MCS table used for modulation of the corresponding sidelink signal among the MCS table set. To this end, the SCI may include specific field such as an MCS delivery field including information indicating the corresponding MCS table.

As an example, the corresponding SCI may be a 1st-stage SCI made up of SCI format 0-1 used for scheduling a 2nd-stage SCI for the sidelink data channel such as the PSSCH and the sidelink control channel such as the PSSCH. In this case, as an example, the SCI may further include a 5-bit MCS field indicating any one of 32 MCS indexes in the corresponding MCS table.

As an example, the information on the MCS table is provided by the SCI comprising scheduling information for the PSSCH, but it is not limited thereto. The information indicating the MCS table may be transmitted through an SCI different from the SCI to which information on the MCS index or scheduling information for the PSSCH is transmitted.

As other example, when receiving the sidelink signal from the transmitting user equipment, the receiver 1830 may be configured to receive the information on the MCS table used for the modulation of the sidelink signal among the MCS table set through the higher layer signaling. As an example, the receiver 1830 may receive information on the MCS table through PC5 RRC signaling.

As other example, the information on the MCS table used for modulation of the corresponding sidelink signal among the MCS table set may be received differently according to a mode of sidelink transmission. For example, in the mode 1, the information on the MCS table is indicated through the higher layer signaling, and in the mode 2, information on the MCS table may be transmitted by the SCI.

The controller 1820 may perform demodulation on the received sidelink signal based on the information on the received MCS table. The receiver 1830 may receive the sidelink signal such as the PSCCH or the PSSCH from the transmitting user equipment. In order to check the data included in the received sidelink signal, the controller 1820 may check the indicated MCS table according to the information on the MCS table among the set of MCS tables. The controller 1820 may demodulate and decode the received sidelink signal, based on the modulation order and code rate information corresponding to the MCS index received by the SCI in the indicated MCS table.

According to the above-mentioned embodiment, it is possible to provide the specific apparatus capable of transmitting and receiving information required to modulate and demodulate the signal transmitted from the sidelink in the case of NR V2X necessary for using a number of the MCS tables in the sidelink communication.

Figure 19:
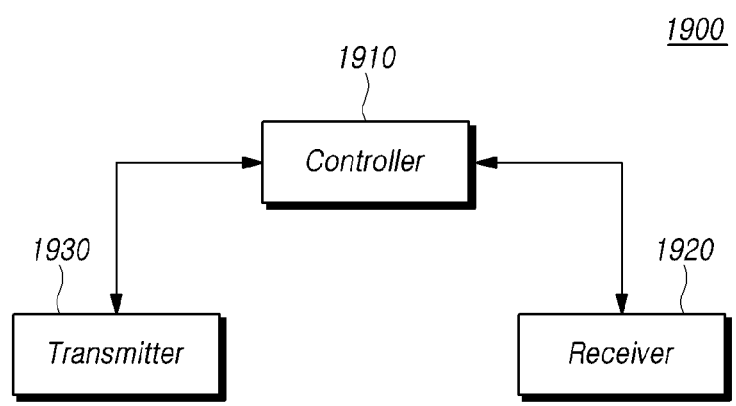
FIG. 19 is a block diagram illustrating a receiving user equipment in accordance with an embodiment.

FIG. 19 is a block diagram illustrating a transmitting UE 1900 in accordance with further another embodiment.

Referring to FIG. 19, the transmitting UE 1900 in accordance with an embodiment includes a controller 1910, a transmitter 1930, and a receiver 1920.

The controller 1910 controls overall operations of the UE 1900 according to methods for allowing the transmitting UE 1900 to receive the information on the modulation and the demodulation for the sidelink transmission, needed to perform the embodiments of the present described above. The transmitter 1930 is used to transmit signals, messages, and data needed for carrying out the embodiments described above to a UE. The receiver 1930 is used to receive signals, messages, and data needed for carrying out the embodiments described above from a UE.

The receiver 1920 receives configuration information on a resource pool used for sidelink transmission. The base station may configure the resource pool on radio resources for sidelink transmission and reception between the UE and other UEs. Here, the resource pool may be a radio resource to be used to transmit and receive the PSCCH, the PSSCH, etc. between the user equipment and other user equipments. The receiver 1920 may receive the configuration information on the resource pool from the base station through higher layer signaling.

The controller 1910 may perform modulation of the sidelink signal by using an MCS table among at least one MCS table for the resource pool based on the configuration information. The receiver 1920 may receive information on an MCS for demodulating and decoding the sidelink signal received from the transmitting UE. The information on the MCS may include information on the MCS table which includes modulation order (Qm) and code rate (R) used to encode and modulate the sidelink signal.

As an example, when configuring the resource pool, the base station transmits to the transmitting UE and the receiving UE the information on a set or group of the MCS table including at least one MCS table that may be applied to the sidelink signal transmitted and received using the resource pool together with the configuration information for the resource pool. The MCS table set may include a plurality of the MCS tables. As other example, the base station may transmit information on the MCS table set that may be used for the sidelink transmission between specific user equipments through RRC signaling.

For example, the MCS table set may include at least one table selected among three MCS tables including modulation order (Qm) and code rate (R) for a PSSCH (Physical Sidelink Shared Channel) according to an MCS index for the resource pool. The three MCS tables may be defined. The number of the defined MCS tables may be three as an example, but it is not limited thereto. For example, the number of the defined MCS tables may vary.

As an example, the MCS table set may include at least one MCS table that may be used for the sidelink transmission in the configured resource pool among three MCS tables defined in the 3GPP TS 38.213: table 5.1.3.1-1, table 5.1.3.1-2, and table 5.1.3.1-3, between the transmitting user equipment and the receiving user equipment. That is, among three MCS tables, a subgroup including the MCS table to be used for the sidelink transmission in the resource pool may be indicated to the receiving user equipment through RRC signaling.

As an example, when the transmitter 1930 transmits the sidelink signal to the receiving UE, the controller 1910 may determine the MCS table used for modulation of the corresponding sidelink signal among the MCS table set. For example, the controller 1910 may determine the MCS table among the MCS table set based on at least one of its power status, its capability, or state of the sidelink channel, etc.

The controller 1910 may determine an MCS index corresponding to modulation order and the code rate to be used for transmission of the sidelink signal from the determined MCS table. The controller 1910 may encode and modulate the sidelink signal based on the corresponding modulation order (Qm) and the code rate (R). Thereafter, the transmitter 1930 may transmit the modulated sidelink signal to the receiving user equipment.

The transmitter 1930 may transmit information on the MCS table used for the modulation of the sidelink signal among the at least one MCS table.

As an example, the transmitting user equipment may transmits through the SCI the information on the MCS table used for modulation of the corresponding sidelink signal among the MCS table set. To this end, as an example, the SCI may include specific field such as an MCS delivery field including information indicating the corresponding MCS table.

As an example, the SCI may be a 1st-stage SCI consisting of SCI format 0-1, and be used for scheduling the PSSCH and a 2nd-stage SCI for the PSSCH. In this case, as an example, the SCI may further include a 5-bit MCS field indicating any one of 32 MCS indexes in the corresponding MCS table.

As an example, the information on the MCS table is provided by the SCI including scheduling information for the PSSCH, but it is not limited thereto. The information indicating the MCS table may be transmitted through an SCI different from the SCI to which information on the MCS index or scheduling information for the PSSCH is transmitted.

When the receiver 1920 receives the sidelink signal such as the PSCCH or the PSSCH from the transmitting user equipment, the controller may check the indicated MCS table according to the information on the MCS table among the set of MCS tables in order to check the data included in the received sidelink signal. The receiving user equipment may demodulate and decode the received sidelink signal, based on the modulation order and code rate information corresponding to the MCS index received by the SCI in the indicated MCS table.

According to the above-mentioned embodiment, it is possible to provide the specific apparatus capable of transmitting and receiving information required to modulate and demodulate the signal transmitted from the sidelink in the case of NR V2X necessary for using a number of the MCS tables in the sidelink communication.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of performing a sidelink communication by a receiving user equipment (UE), the method comprising:
   receiving modulation and coding scheme (MCS) table set information for the sidelink communication;
   receiving sidelink control information (SCI) including a specific field that indicates one MCS table from a MCS table set; and
   receiving a physical sidelink shared channel (PSSCH) based on the indicated one MCS table,
   wherein a number of bits of the specific field of the SCI varies according to a number of MCS tables in the MCS table set, and
   wherein the number of MCS tables in the MCS table set is defined by the received MCS table set information.

2. The method according to claim 1, wherein the SCI is received from a transmitting UE.

3. The method according to claim 2, wherein a format of the SCI is SCI format 0-1.

4. The method according to claim 1, wherein the MCS set information is received from a base station.

5. A method of performing a sidelink communication by a transmitting user equipment (UE), the method comprising:
   receiving modulation and coding scheme (MCS) table set information for the sidelink communication;
   transmitting sidelink control information (SCI) including a specific field that indicates one MCS table from a MCS table set; and
   transmitting a physical sidelink shared channel (PSSCH) based on the indicated one MCS table,
   wherein a number of bits of the specific field of the SCI varies according to a number of MCS tables in the MCS table set, and
   wherein the number of MCS tables in the MCS table set is defined by the received MCS table set information.

6. The method according to claim 5, wherein the SCI is transmitted to a receiving UE.

7. The method according to claim 6, wherein a format of the SCI is SCI format 0-1.

8. The method according to claim 5, wherein the MCS set information is received from a base station.

9. A user equipment (UE) for performing a sidelink communication, the UE comprising:
   a receiver configured to receive modulation and coding scheme (MCS) table set information for the sidelink communication, receive sidelink control information (SCI) including a specific field that indicates one MCS table from a MCS table set, and receive a physical sidelink shared channel (PSSCH); and
   a controller configured to perform the reception of the PSSCH based on the indicated one MCS table,
   wherein a number of bits of the specific field of the SCI varies according to a number of MCS tables in the MCS table set, and
   wherein the number of MCS tables in the MCS table set is defined by the received MCS table set information.

10. The UE according to claim 9, the SCI is received from a transmitting UE.

11. The UE according to claim 10, wherein a format of the SCI is SCI format 0-1.

12. The UE according to claim 9, wherein the MCS set information is received from a base station.

* * * * *